Jan. 26, 1937.　　　H. J. B. KERR　　　2,069,010
MACHINE FOR CUTTING SEED POTATOES
Filed Dec. 6, 1935　　　3 Sheets-Sheet 1

Inventor
H. J. B. Kerr.

By Lacey & Lacey, Attorneys

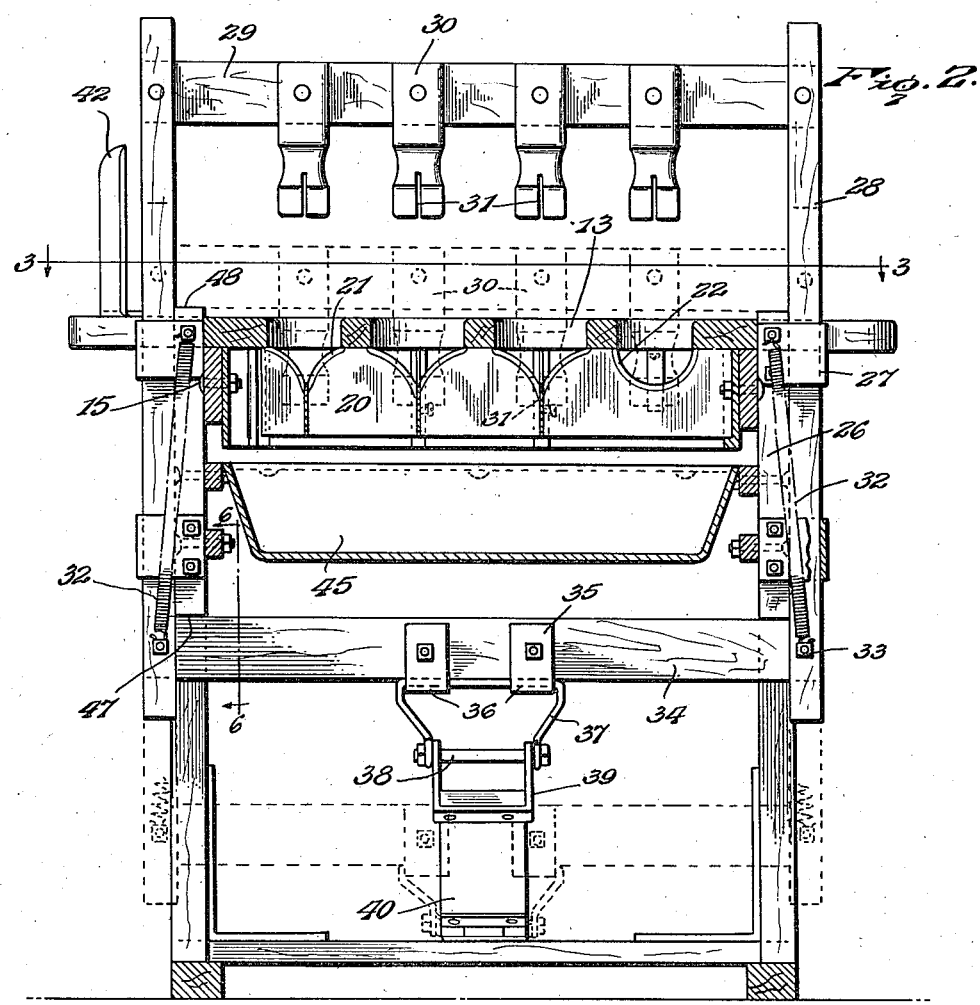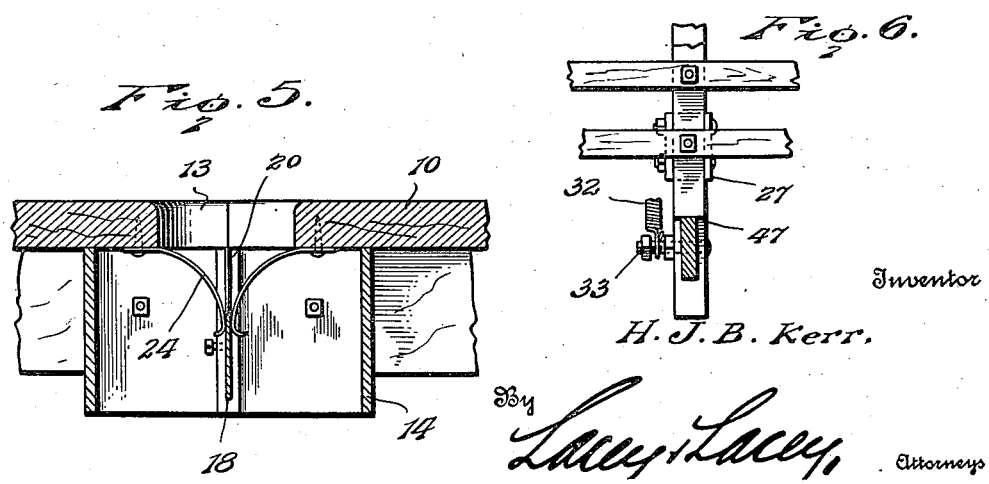

Jan. 26, 1937.　　　H. J. B. KERR　　　2,069,010
MACHINE FOR CUTTING SEED POTATOES
Filed Dec. 6, 1935　　　3 Sheets-Sheet 3
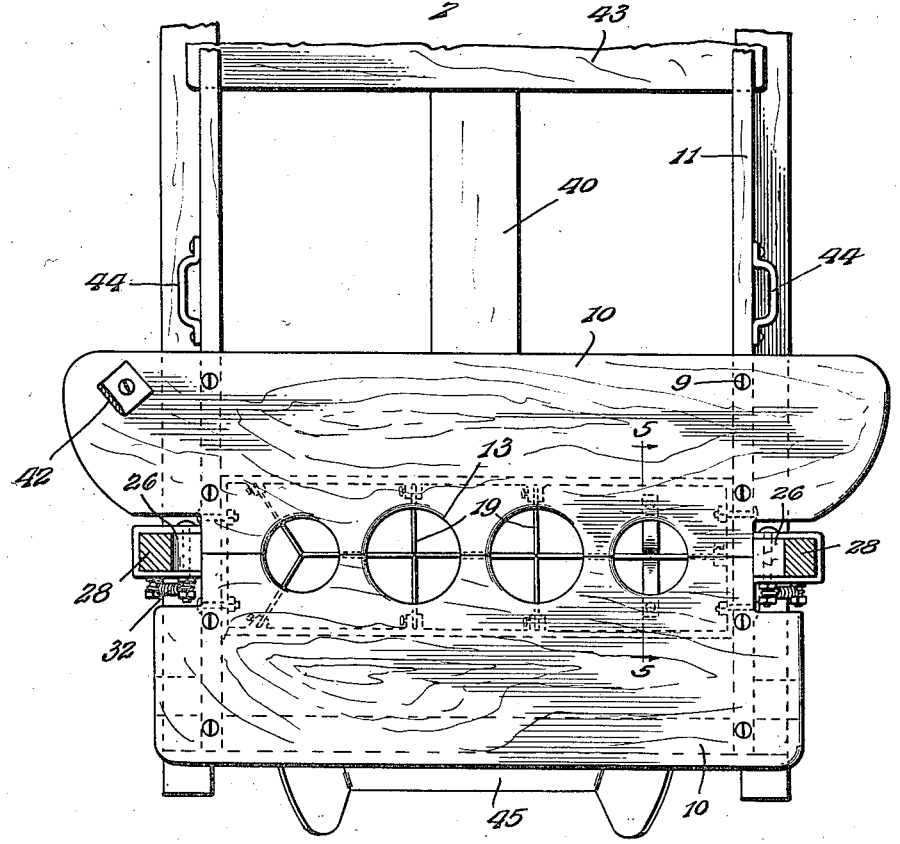

Patented Jan. 26, 1937

2,069,010

UNITED STATES PATENT OFFICE 2,069,010

MACHINE FOR CUTTING SEED POTATOES

Horace J. B. Kerr, Millersburg, Pa.

Application December 6, 1935, Serial No. 53,241

3 Claims. (Cl. 146—169)

This invention relates to potato cutters and more particularly to a machine for cutting seed potatoes.

The object of the invention is to provide a seed potato cutter of simple and durable construction by means of which potatoes of different sizes may be conveniently cut into segments for planting purposes.

A further object of the invention is to provide a machine of the class described including a plurality of cutting knives having a vertically movable frame associated therewith and on which are mounted spaced plungers for pressing the potatoes in contact with the knives, means being provided at one side of the machine for reciprocating the plunger carrying frame and means disposed at the other side of the machine for guiding the cut potatoes into a suitable receptacle.

A further object is to provide the machine with a table formed with potato receiving pockets or openings of different sizes and to so arrange the cutting knives beneath said openings as to permit the potatoes to be cut into any desired number of parts or segments.

A further object is to provide novel means for mounting the cutting knives beneath the receiving table whereby said knives may be removed as a unit to facilitate cleaning or to permit the knives to be sharpened or replaced when necessary.

A still further object of the invention is generally to improve this class of devices so as to increase their utility, durability and efficiency.

In the accompanying drawings forming a part of this specification and in which similar numerals of reference indicate corresponding parts in all the figures of the drawings, Figure 1 is a longitudinal sectional view of a machine for cutting seed potatoes constructed in accordance with the present invention.

Figure 2 is a vertical sectional view taken on the line 2—2 of Figure 1.

Figure 3 is a transverse sectional view taken on the line 3—3 of Figure 2.

Figure 4 is a top plan view of the knife frame showing the manner of mounting the knives therein.

Figure 5 is a transverse sectional view of knife frame and receiving table taken on the line 5—5 of Figure 3.

Figure 6 is a detail vertical sectional view taken on the line 6—6 of Figure 2.

Figure 1:
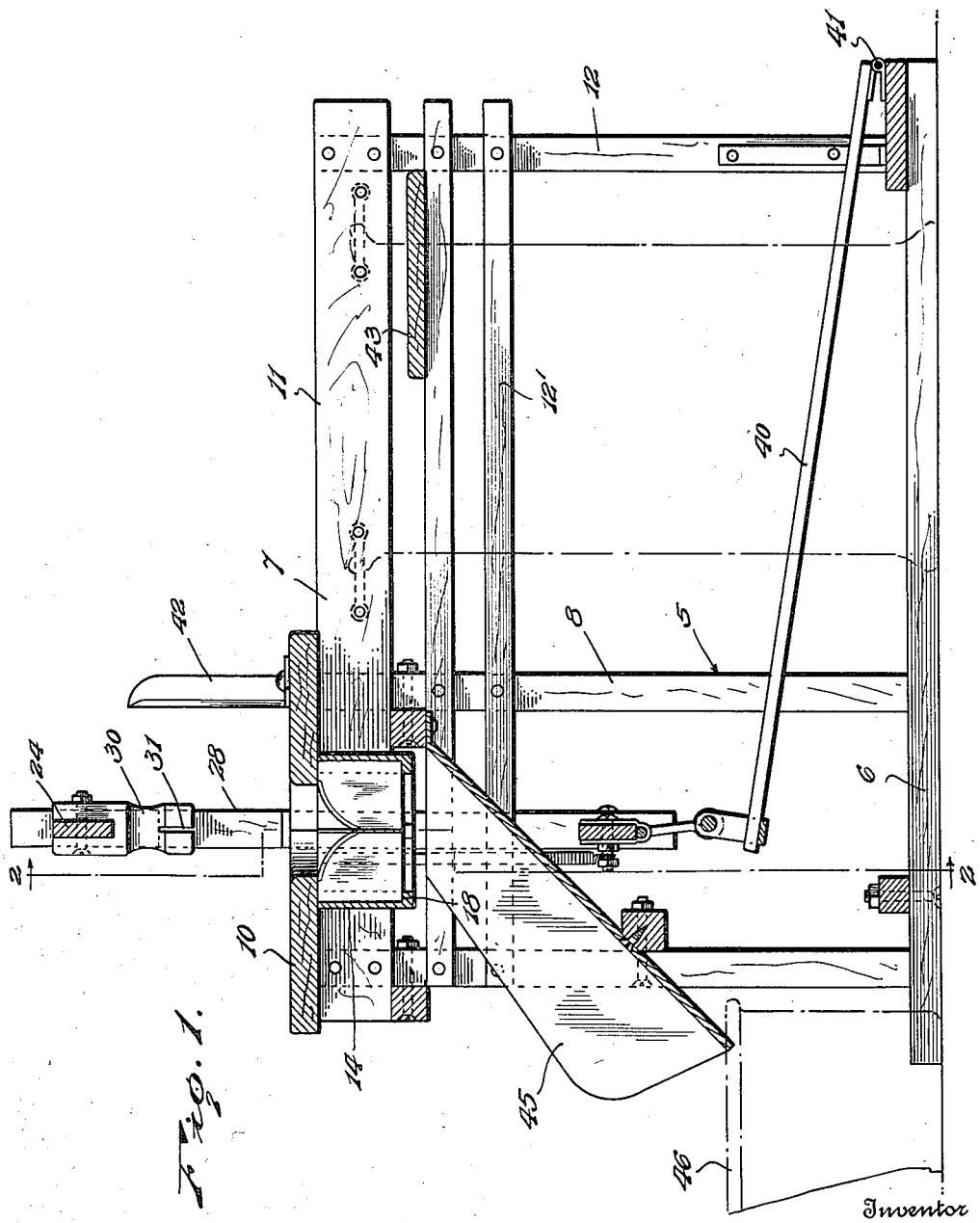

The improved potato cutting machine forming the subject-matter of the present invention comprises a main supporting frame 5 including upper and lower longitudinal sills 6 and 7 connected by spaced uprights 8 and to which is detachably secured by screws or similar fastening devices 9 a receiving table 10. The upper and lower sills 6 and 7 are extended longitudinally at the rear end of the machine to form spaced side walls 11, the ends of which are secured to standards 12 so as to form an intermediate passageway between the side walls for the purpose hereinafter referred to. The side walls 11 are preferably reinforced and strengthened by spaced slats 12' which are also secured to the main frame, as best shown in Figure 1 of the drawings. Formed in the receiving table 10 are a plurality of potato receiving openings 13 of different sizes and arranged immediately below the openings 13 is a cutter carrying box or frame 14. The frame 14 is of elongated formation and preferably cast or otherwise formed from metal, said frame being bolted or otherwise rigidly secured to the upper sills 7, as indicated at 15. Extending inwardly from the frame 14 and preferably cast or otherwise formed integral therewith are ribs 16 having vertical seating grooves or kerfs 17 formed therein and terminating short of the lower ends of the ribs 16 to form stop shoulders 18. Detachably mounted in the box or frame 14 is an integral cutting unit 19 formed of intersecting cutting blades 20, certain of the blades having their cutting edges convex, at 21, and others concave, as indicated at 22. At the intermediate potato receiving openings 13, the cutting blades intersect so that when a potato is inserted through said openings in contact with the blades, said blades will quarter the potato. The cutting blades at one end opening 13 are disposed in diverging relation, as indicated at 23, so as to cut a potato in three sections, while the concave blade 22 at the opposite end opening 13 is disposed in a straight line so as to halve a potato. Secured to the lower surface of the receiving table at the concave cutting blade 22 are depending spring fingers 24, the lower ends of which are deflected laterally and normally and yieldably bear against the cutting blade 22 so that when a potato is inserted within the adjacent opening, the fingers will hold the potato in contact with the blade during the cutting operation. The cutting unit is detachably secured in position within the box by means of set screws 25 which are threaded in the ribs 17 and bear against the adjacent blades of the cutting unit, as best shown in Figure 4 of the drawings. When the cutting unit is positioned within the box or frame 14, the lower end of the cutting unit will bear against the stop shoulders 18 so as to limit the downward movement of said unit while the screws 25 will securely hold the said cutting unit in place. By removing the screws 9, the receiving table 10 may be lifted off the machine and in which position the cutting elements as a unit may be bodily removed from the frame 14 for cleaning or sharpening when necessary by merely loosening the clamping screws 25, as will be readily understood.

Mounted on the main frame at opposite sides thereof are vertical strips 26 to which are secured spaced loops 27 which form guides for a vertically reciprocating frame 28. The reciprocating frame 28 is provided at its upper end with a cross bar 29 to which are secured spaced plungers 30, the lower ends of which are formed with kerfs 31 conforming to the angularity of the adjacent cutting blades and adapted to receive said blades when the reciprocating frame is moved downwardly. The reciprocating frame 28 is normally and yieldably supported in elevated position by means of coil springs 32, one end of which is secured to the main frame of the machine and the other end thereof secured, at 33, to the lower end of the reciprocating frame. A cross bar 34 connects the lower end of the reciprocating frame and secured to said cross bar are spaced strap irons 35 having terminal eyes 36 adapted to receive a supporting link 37. A pivot rod 38 extends through the depending ends of the link 37 and also through eyes or openings formed in a U-shaped member or stirrup 39 which latter is secured to the adjacent end of a foot pedal 40. The rear end of the foot pedal 40 is hingedly mounted, at 41, between the side walls 11 of the main frame so that when downward pressure is exerted on the pedal 40, the reciprocating frame will be pressed downwardly against the tension of the springs 32 thereby causing the plungers 30 to press the potatoes through the openings in the receiving table and in direct contact with the blades of the cutting unit. When pressure on the foot pedal is removed, the springs will automatically return the reciprocating frame to elevated position. Mounted on the receiving table at one or both sides thereof is a vertical knife 42, the purpose of which is to sever or cut relatively large potatoes to permit them to pass through the openings 13 and also to permit a potato in certain cases to be halved or quartered so that when a halved potato is positioned, in say the central opening 13, said potato will be cut into eight pieces instead of four.

Extending transversely between and supported on the adjacent slats 12′ is a plank 43 which constitutes a seat upon which the operator may sit when using the machine so that his feet will be in convenient position to actuate the pedal 40. Loops or eyes 44 are also preferably secured to the side walls of the main frame to permit a box or sack containing potatoes to be conveniently suspended therefrom so as to be in convenient reach of the operator. Disposed beneath the cutting knives is a trough or chute 45 preferably extending the entire width of the box or frame 14 and having its lower end inclined downwardly for guiding the cut seed potatoes into a basket or other receptacle 46 designed to receive the same. It will here be noted that the lower ends 47 of the vertical strips 26 form stops or abutments for contact with the transverse beam 34 of the reciprocating frame so as to limit upward movement thereof, while the upper ends of the strips 26 constitute stops 48 which contact with the upper transverse bar 29 and serve to limit the downward movement of the said reciprocating frame.

In operation, the attendant sits on the plank 43 with his feet extending between the side walls 11 of the main frame and with a bag of potatoes suspended from the loops 44 on either the right or left side of the machine. The potatoes from the bag are then fed into the respective openings 13 and a downward pressure exerted on the foot pedal 40 which causes the plungers 30 to descend and force the potatoes through the openings 13 and in contact with the adjacent cutting blades thereby causing the potatoes to be cut into several parts. After the potatoes are cut, they drop into the trough 45 and are delivered into the basket or container 46 where they may be used for planting purposes in the usual manner. If a potato is too large to enter any one of the openings 13 or it is desired to cut a large potato into eight or more sections, said potato is first severed with the knife 42 and the parts thereof held together and then inserted in the opening 13 in the receiving table where they will be cut by depressing the pedal 40. If it is only desired to halve a potato, said potato is inserted in the opening 13 above the concave knife 22 where it will be held in contact with the knife by the spring fingers 24 during the downward movement of the reciprocating frame, as will be readily understood. In order to remove the cutting blades to permit cleaning thereof or sharpening or replacement when desired, it is only necessary to remove the screws 9 and elevate the receiving table 10, which is preferably made in sections to facilitate its removal, when the cutting unit as a whole may be readily removed from the box 14 in the manner previously described.

From the foregoing description, it is thought that the construction and operation of the device will be readily understood by those skilled in the art and further description thereof is deemed unnecessary. It will, of course, be understood that the machines may be made in different sizes and shapes and constructed from wood, iron or any other suitable material without departing from the spirit of the invention. It will further be understood that any desired number of potato receiving pockets may be formed in the table or platform and that the blades of the cutting unit may be arranged at any desired angle to permit potatoes to be cut in any desired number of parts.

Having thus described the invention, what is claimed as new is:

1. In a machine of the class described, the combination with a table having a plurality of potato receiving openings of different sizes formed therein, of an open ended box frame disposed beneath the receiving table and provided with spaced inwardly projecting ribs extending to the upper longitudinal edge of the box frame and having seating grooves formed therein and terminating short of the lower longitudinal edge of the box frame to form stops, a unitary cutting element detachably mounted in the box frame and comprising a longitudinal knife having one end thereof provided with diverging portions disposed beneath one of the potato receiving openings, intersecting portions disposed below another opening and a straight portion extending beneath a third opening, said straight portion of the knife having a concave cutting edge and the remaining portion of the knife having convex cutting edges, and clamping means extending through the ribs above said stops and engaging the adjacent portions of the knife for detachably securing the cutting element in position on the box frame.

2. A machine for cutting seed potatoes comprising a main frame having upper and lower side sills, vertical standards connecting said sills, horizontal slats secured to said standards and spaced vertically from the upper sill and each other, a table supported across one end of said frame and removably secured upon said upper sills and formed with openings, a box secured between the upper sills under said table and open at its top and bottom, knives removably mounted in said box with portions exposed through the openings of the table, a reciprocating frame mounted for vertical sliding movement over said table, spacing means yieldably holding the reciprocating frame elevated, plungers carried by said reciprocating frame over the openings, a treadle extending longitudinally in the lower portion of the main frame and having its rear end pivotally mounted and its front end connected with the reciprocating frame, and a seat board extending transversely in said main frame and removably supported upon selected ones of said slats and shiftable along the same towards and away from the table.

3. A machine for cutting seed potatoes comprising a main frame, a stationary table mounted on the forward portion of the main frame and provided with potato-receiving openings of different sizes, vertical strips rigidly secured to the opposite sides of the frame, upper and lower guide loops carried by the vertical strips, a reciprocating frame having side bars slidably mounted within said loops and upper and lower cross bars carried by the side bars and disposed above and below ends of the strips and in the plane of the strips, spaced plungers carried by the upper cross bar over the openings of the table, cutting blades disposed beneath the openings in the receiving table, springs forming a yieldable connection normally holding the reciprocating frame in elevated position, a foot pedal operatively connected with the lower cross bar of the reciprocating frame, and a chute disposed beneath the cutting knives, the upper ends of the vertical strips constituting stops for engaging the upper cross bar and limiting the downward movement of the reciprocating frame and the lower ends of the vertical strips constituting stops for engaging the lower cross bar and limiting the upward movement of said reciprocating frame.

HORACE J. B. KERR.